United States Patent Office 2,970,173
Patented Jan. 31, 1961

2,970,173

POLYFLUOROTHIOKETONES AND METHOD OF PREPARING SAME

Edward G. Howard, Jr., Hockessin, and William J. Middleton, Claymont, Del., assignors to E. I. du Pont de Nemours and Company, Wilmington, Del., a corporation of Delaware No Drawing. Filed Feb. 9, 1959, Ser. No. 791,857

10 Claims. (Cl. 260—607)

This invention relates to a new class of fluorinated organic compounds containing sulfur, their preparation, and their polymerization.

Fluorinated compounds of various types are known and many of them possess properties that make them valuable in particular applications. For example, certain fluorinated compounds exhibit biological activity. Others are useful as intermediates for the preparation of valuable polymers. It is therefore a desirable goal to develop new types of fluorine-containing compounds having specific biological activity and which can be polymerized to polymers having a desirable combination of properties, particularly high chemical and thermal stability.

A new and useful class of fluorine- and sulfur- containing compounds is provided by this invention. The products of this invention are polyfluorothioketones in which the carbons attached to the thiocarbonyl carbon are free from hydrogen. A preferred group of the polyfluorothioketones has the general formula

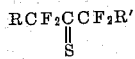

wherein R and R' are halogen, hydrocarbon or halohydrocarbon, normally of up to six carbons, particularly alkyl or haloalkyl.

The polyfluorothioketones of this invention can be prepared by several different methods.

(A) One method consists in reacting a secondary polyfluoroalkyl iodide (i.e., of at least three carbon atoms) with hot liquid or vapor of a phosphorus polysulfide, e.g., $P_2S_5$ or $P_4S_3$, as illustrated by the equation

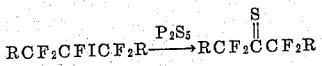

wherein the R groups are halogen, alkyl, and haloalkyl. Preferably, the polyfluoroalkyl iodide is introduced in vapor form into the refluxing phosphorus polysulfide and the volatile polyfluorothioketone which is formed is collected in a receiver cooled below the boiling point of the polyfluorothioketone, e.g., in a trap cooled by a mixture of solid carbon dioxide and acetone. The polyfluorothioketone isolated in the cold receiver can be purified if desired by fractional distillation, usually under reduced pressure.

A convenient method for introducing the fluoroalkyl iodide into the molten phosphorus sulfide consists in passing a stream of nitrogen or other inert gas through a supply of the polyfluoroiodide warmed to a temperature slightly below its boiling point and then passing the stream of gas containing the vapors of the polyfluoroiodide directly into the refluxing phosphorus sulfide.

The reaction is conveniently carried out at atmospheric pressure at the temperature of the refluxing phosphorus sulfide, e.g., at 525° C. when $P_2S_5$ is being used and at 413° C. when $P_4S_3$ is being used. Higher temperatures, and correspondingly higher pressures can be used as long as the temperature is below the decomposition temperature of the reactants or products. Subatmospheric pressures, with correspondingly lower temperatures, can also be employed, especially when higher boiling polyfluoroalkyl iodides are being reacted. The reaction between the polyfluoroalkyl iodide and the molten phosphorus sulfide takes place rapidly and the polyfluorothioketone reaction product is removed from the reaction zone as it is formed. Best yields of the polyfluorothioketones are obtained when the vapor of the polyfluoroalkyl iodide is introduced at a fairly rapid rate into the molten phosphorus sulfide.

The phosphorus sulfides used in the process of this invention can be of the grades commercially available or they can be made by known methods. The secondary polyfluoroalkyl iodides used in the process can be made by known methods. For example, they can be made by the free radical addition of the appropriate fluoroalkyl iodide to a fluoroolefin. This and other methods for preparing fluoroalkyl iodides are described in "Aliphatic Fluorine Compounds" by Lovelace, Rausch and Postelnek, Reinhold Publishing Corp., New York, 1958, pages 37–40.

(B) Another method that can be used to prepare the polyfluorothioketones of this invention consists in heating a polyfluoroketone with phosphorus pentasulfide for several hours at elevated temperatures, e.g., 200–300° C. under autogenous pressure. This reaction is illustrated by the equation

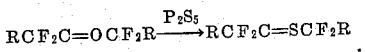

The polyfluoroketones used as starting materials in this method can be prepared by known methods, for example, those described on page 183 of "Aliphatic Fluorine Compounds" mentioned above.

(C) A still further method involves the reaction of a fluorine-containing haloalkyl mercurial with sulfur or an inorganic polysulfide such as the phosphorus polysulfides. This process is further illustrated by the equation

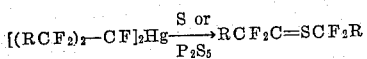

In general the mercurial is introduced into refluxing sulfur or phosphorus polysulfide, at temperatures of usually 400–550° C. The polyfluorothiocarbonyl compound thus produced is removed from the reaction zone as formed by vaporization and collected in a receiver cooled below the boiling point of the desired product. The haloalkyl mercurial employed in this reaction can be obtained as described in appended examples.

(D) Perfluorothioketones can likewise be prepared by reaction of a secondary perfluoroalkanethiol with a hydrogen fluoride acceptor such as sodium fluoride. This reaction is illustrated by the equation

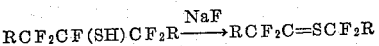

The formation of the thioketones takes place generally at temperatures of 0–100° C. or higher. The pressure employed depends upon the temperature. The fluoroalkylthiols employed as the starting material for this reaction are obtained by action of a thiol on a disulfide in the presence of actinic light.

(E) A still further method involves the reaction of sulfur with a perfluoroolefin of at least three carbons following the general equation

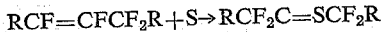

The reaction is brought about by contacting molten sulfur at 400–650° C. with the fluoroolefin in an inert container at a temperature sufficient to maintain the sulfur in a non-solid state.

(F) A still further method for the preparation of selected monomeric polyfluorothioketones included in this invention is the thermal decomposition of certain polyfluorinated diethietanes, i.e., as illustrated by the equation

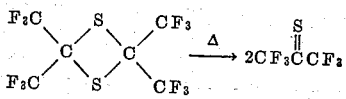

This process is effected at temperatures of generally between 450 and 700° C. The reaction is readily conducted by introducing at a low rate the diethietane into a heated vessel, preferably a heated tube packed with inert solid to effect uniform heat transfer at atmospheric or reduced pressure. The fluorothioketone thus produced is of high purity and is removed by passage into a cooled trap.

The dithietanes used as starting materials are obtained by dimerization of monomeric fluorothioketones. This dimerization takes place at tempartures of above about $-80°$ C. on standing.

This invention is illustrated in further detail by the following examples.

EXAMPLE I (METHOD A)

Perfluorobutanethione

A glass reaction vessel having two necks, each 1" in diameter and about 10" long, was charged with 100 g. of phosphorus pentasulfide. One of the necks of the flask contained an inlet tube for introducing vapor of 2-iodoperfluorobutane. The other neck of the reaction vessel was connected by a ½" diameter glass tube to a receiver cooled in a mixture of solid carbon dioxide and acetone. The reaction vessel was purged with nitrogen and then heated until the phosphorus pentasulfide refluxed about halfway up the exit neck of the flask. Twenty-four grams of 2-iodoperfluorobutane was placed in a separate 2-neck reaction vessel fitted with a nitrogen inlet tube reaching to the bottom of the vessel and an outlet tube attached to the inlet neck of the reaction flask. This flask containing the iodide was placed in a water bath at 75° C. Nitrogen was then bubbled through the liquid iodide at a rate of 2 ml./second and into the reaction flask containing the refluxing phosphorus pentasulfide. In 15 minutes, the addition of the iodide to the reactor was complete. The cold-trap contained 15 g. (10 ml.) of a deep-blue liquid which was transferred to another cold trap by bacuum distillation. Nuclear magnetic resonance analysis of this blue liquid showed three major peaks having areas in a ratio of 3:3:2 in agreement for the formula for perfluorobutanethione.

After standing several days at $-80°$ C., 0.6 ml. of the crude reaction product was purified by vapor chromatography in a column 12' long and ¾" in diameter packed with pieces of fire brick coated with silicon oil of 50 centistokes viscosity of the type available commercially under the trade name "DC-200." The column was precured at 50° C. and the product passed through the column with helium as the carrier gas added at a rate of 240 ml./minute. The number of theoretical plates in the column is 950. All the material coming off the column was condensed. The blue material came off the column simultaneously with the appearance of a large peak in the chart used to monitor the effluent gases. There was obtained 0.15 ml. of deep blue liquid (liquid at $-80°$ C. but solid at the temperature of liquid nitrogen). This purified sample of perfluorobutanethione was also analyzed by nuclear magnetic resonance and there was also obtained three peaks in the ratio of 3:3:2. The $CF_2$ peak is a quadruplet and one of the $CF_3$ peaks is higher and narrower than the other $CF_3$ peak.

*Analysis.*—Calcd. for $C_4F_8S$: C, 20.70%; F, 65.49%; S, 13.81%. Found: C, 20.76%; F, 64.85%; S, 13.56%.

There was also formed in the cold receiver attached to the reaction vessel a small quantity of a solid polymer of perfluorobutanethione.

EXAMPLE II (METHOD B)

Perfluoro-4-heptanethione

A 145-ml. bomb was charged with 30 g. of perfluoro-4-heptanone and 30 g. of phosphorus pentasulfide and heated for 8 hours at 250° C. and then for 2 hours at 300° C. under autogenous pressure. The bomb was cooled and vented and the liquid residue isolated by distillation. The residue was mainly unchanged perfluoro-4-heptanone. There was obtained approximately 0.5 g. of a bright blue liquid boiling at 84–88° C. The nuclear magnetic resonance analysis of this blue fraction indicated it contained appreciable amounts of perfluoro-4-heptanethione.

EXAMPLE III (METHOD C)

Perfluoropropanethione

The reaction vessel and general procedure of Example I were employed except that in the place of the iodoperfluorobutane, 35 g. of bis(perfluoro-2-propyl)mercury was added from a dropping funnel over a period of one hour. There was obtained 2 ml. of carbon disulfide and 8 ml. of blue liquid. When the latter was subjected to distillation at atmospheric pressure, there was obtained 3.5 g. boiling at 107° C. This product solidified when cooled to 0° C. and was identified as the dimer of perfluoropropanethione.

EXAMPLE IV (METHOD C)

4H-heptafluoro-2-butanethione

To refluxing sulfur (100 g.) under a nitrogen flow of 1 ml./second was added 50 g. of bis(4H-octafluoro-2-butyl)mercury in the period of one-half hour. The material collected in the solid carbon dioxide/acetone-cooled trap affixed to the vessel was distilled under vacuum to another similarly cooled trap by warming the first trap slightly. When the condensate was no longer blue, the distillation was stopped. The product in this second trap was carefully rectified in a distillation column 18" high, 10 mm. in cross section, and packed with glass helices. The thioketone distilled at $-27°$ C./20 mm. to $-19°$ C./18 mm. and weighed 7.5 g. (4.5 ml.). It was intense blue-purple in color.

*Analysis.*—Calcd. for $C_4HF_7S$: C, 22.4%; H, 0.47%; F, 62.2%. Found: C, 22.1%; H, 0.50%; F, 59.8%.

The bis(4H-octafluoro-2-butyl)mercury was prepared as follows: A mixture of 72 g. of mercuric fluoride, 100 g. of 4H-heptafluoro-1-butene, and 100 g. of hydrogen fluoride was heated to 120° C. for 12 hours. After the hydrogen fluoride evaporated, the product was washed with dilute sodium bicarbonate, dried over calcium chloride, and distilled, B.P. 172.5–173° C., weight=120 g., D=2.44 g./ml. It was inert to hot conc. nitric acid.

*Analysis.*—Calcd. for $C_8F_{16}H_2Hg$: Hg, 33.3%; F, 50.3%. Found: Hg, 32.5%; F, 49.4%.

The olefin for the above process was obtained by thermal decomposition of the sodium salt of 5H-octafluoropentanoic acid.

EXAMPLE V (METHOD C)

4-chloroheptafluorobutanethione

The process of the preceding example was repeated except that 7 g. of bis(4-chlorooctafluoro-2-butyl)mercury was employed. The mercury compound ws added in 7½ minutes with a nitrogen flow of 2 ml./second. The blue thio compound obtained was collected in a trap cooled by solidified carbon dioxide in acetone.

The mercury compound employed in this process was prepared by reaction of 56 g. of 4-chloroheptafluoro-1-butene, 36 g. of mercuric fluoride, and 100 g. of hydrogen fluoride at 120° C. for 12 hours. The mercury compound was distilled at 185° C. and redistilled at 85–87° C./20 mm. It had a density of 2.42 g./ml.

Analysis.—Calcd. for $C_8F_{16}Cl_2Hg$: Cl, 10.5%; Hg, 30.0%. Found: Cl, 10.5%; Hg, 30.4%.

The 4-chloroheptafluoro-1-butene was obtained by heating 106 g. of sodium 5-chlorooctafluoropentanoate at 340° C. There resulted 58 g. of the olefinic compound boiling at 34° C.

Analysis.—Calcd. for $C_4F_7Cl$: F, 60.2%; Cl, 16.4%. Found: F, 61.3%; Cl, 16.7%.

EXAMPLE VI (METHOD C)
*Perfluoropropanethione*

Sulfur, 40 g., was placed in the bottom of an upright U-tube 1" in diameter and 12" high. A dropping funnel was connected to one end of the tube and the other end was connected to a trap cooled by solid carbon dioxide/acetone. Sulfur was heated until the vapors refluxed about four inches up the arms of the tube and a slow stream of nitrogen was passed through the tube. Bis(heptafluoro-2-propyl)mercury, 10.78 g. (0.02 mole), was added dropwise over a period of 30 minutes through one arm of the tube. The blue condensate in the trap was distilled at 1 mm. pressure from the solid carbon dioxide/acetone cooled trap to a trap cooled by liquid nitrogen. There was obtained 1.55 g. (55% based on recovered starting material) of perfluoropropanethione (hexafluorothioacetone) and 6.2 g. of recovered mercurial. The deep blue perfluoropropanethione was identified by its n-m-r spectrum and by mass spectrometric analysis.

The bis(heptafluoro-2-propyl)mercury was obtained as follows: A 400-ml. bomb charged with 150 g. (1 mole) of hexafluoropropylene, 100 g. (0.4 mole) of mercuric fluoride, and 100 g. of hydrogen fluoride was heated at 150° C. for 12 hours. The bomb was cooled and vented and then evacuated briefly to remove the remainder of the hydrogen fluoride. The residue was filtered and the filtrate was distilled. There was obtained 94.5 g. of bis-(heptafluoro-2-propyl)mercury as a colorless, mobile liquid, B.P. 117° C.; $n_D^{25}$, 1.3244.

Analysis.—Calcd. for $C_6F_{14}Hg$: Hg, 37.24%. Found: Hg, 36.90%.

EXAMPLE VII (METHOD D)
*Perfluorobutanethione*

Perfluoro-2-butanethiol, 0.25 g., was distilled at 200 mm. pressure through a glass tube packed with 25 g. of sodium fluoride pellets. The gas was condensed in a U-tube cooled in solid carbon dioxide/acetone. The U-tube was then warmed gently and the more volatile fraction was distilled out and condensed in another U-tube cooled in solid carbon dioxide/acetone. The more volatile fraction was intensely blue and was identified as perfluorobutanethione by its n-m-r spectrum.

The perfluoro-2-butanethiol was obtained as follows: A stirred solution of 10.04 g. (0.02 mole) of perfluoro-2-butane disulfide in 24.8 g. of 2,2,3,3,4,4,5,5-octafluoropentanethiol was irradiated with ultraviolet light for five days. The pressure above the solution was maintained at 50 mm. by means of a water-pump and a slow stream of nitrogen was bubbled through the solution during the irradiation. The entrained gases were condensed in a trap cooled by solid carbon dioxide/acetone. There was obtained 5.2 ml. of a colorless condensate. The condensate was distilled to give 0.27 g. of a colorless liquid, B.P. 53° C., and 5.16 g. of higher boiling material, B.P. 105–200° C. The fraction boiling at 53° C. was identified as perfluoro-2-butanethiol by examination of its n-m-r spectrum.

The disulfide for the preceding was prepared as follows: A 145-ml. bomb was charged with 50 g. of 2-iodoperfluorobutane and 50 g. of sulfur and was heated to 250° C. for 12 hours. The bomb was cooled and vented and the liquid residue was shaken with mercury, filtered, and then distilled. There was obtained 8.1 g. of perfluoro-2-butyl disulfide, B.P. 43–46° C./10 mm.; $n_D^{26.3}$, 1.3293, and 4.4 g. of perfluoro-2-butyl trisulfide, B.P. 70–71° C./10 mm.; $n_D^{26.3}$, 1.3618.

Analysis.—Calcd. for $C_8F_{13}S_2$: C, 19.13%; F, 68.10%; S, 12.77%. Found: C, 19.43%; F, 68.97%; S, 12.83%.

EXAMPLE VIII (METHOD E)
*Perfluoropropanethione*

A ¾" platinum tube set vertically and heated by means of a vapor bath containing chlorobenzene (B.P. 132° C.) was equipped with a dropping funnel, a gas inlet tube, thermocouple attached to the outside of the platinum tube, heater, receiver, and a trap cooled with solid carbon dioxide/acetone mixture. The tube was packed (starting from the bottom) with platinum gauze, 5 g. of sodium fluoride pellets, and platinum gauze and heated at 432°–625° C. A total of 84 g. of hexafluoropropene was added over a period of 1½ hours while also adding 26 ml. of sulfur at 132° C. and nitrogen at a rate of 0.4 ml./second. The product weighed 88 g. and was green in color. On distillation there was obtained 1.5 g. of deep blue perfluoropropanethione (hexafluorothioacetone) whose structure was confirmed by n-m-r spectrum. On standing in a sealed tube at room temperature it turned colorless. This liquid solidified in ice and consisted of the dimer,

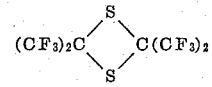

When the above procedure was repeated except the sodium fluoride was left out, the thioketone was also obtained.

EXAMPLE IX
*Tetrakis(trifluoromethyl)-1,3-dithietane (also named perfluorotetramethyl-1,3-dithietane)*

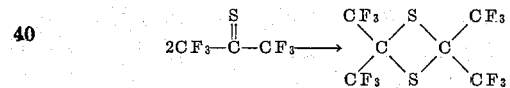

Perfluoropropanethione, 0.7 g., was sealed in a glass tube and allowed to warm from −80° C. to room temperature. The color faded from deep blue to green and then to yellow over a period of five hours. The resulting liquid was frozen in an ice bath and sublimed at 1 mm. pressure into a trap cooled by solid carbon dioxide/acetone. There was obtained 0.25 g. of perfluorotetramethyl-1,3-dithietane as a white solid, M.P. 22–23° C.

Analysis.—Calcd. for $C_6F_{12}S_2$: C, 19.79%; F, 62.61%; S, 17.61%. Found: C, 19.64%; F, 62.36%; S, 17.52%.

The following example shows the preparation of this compound in larger amounts.

EXAMPLE X

Mercury, 40.2 g., was added dropwise to a flask containing 150 g. of sulfur heated to reflux. A total of 108 g. of bis(heptafluoro-2-propyl)mercury was then added dropwise over a period of two hours. A slow stream of nitrogen was also passed through the reaction mixture during the addition. The effluent gases were condensed in a trap cooled by solid carbon dioxide/acetone. At the end of the reaction the trap contained a mixture of a deep blue liquid and a white solid. The more volatile blue component was distilled at reduced pressure from the trap into another trap cooled by liquid nitrogen. The deep blue-black distillate (hexafluorothioacetone) was allowed to warm slowly to room temperature under autogenous pressure. After 16 hours the blue color had faded to yellow. Distillation of this material gave 19.6 g. of a light yellow oil, B.P. 99–111° C. Examination of the n-m-r spectrum of this material indicated that it was principally tetrakistrifluoromethyl-1,3-diethietane with small amounts of impurity present.

The impure dimer was shaken with 50 ml. of 10% sodium hydroxide and 25 ml. of 30% hydrogen peroxide until the initial exothermic reaction had subsided. The organic layer was separated, dried over silica gel, and distilled. There was obtained 13.8 g. of tetrakis(trifluoromethyl)-1,3-dithietane as a colorless oil, B.P. 110° C., M.P. 22–23° C.; $n_D^{26}$, 1.3360. Identification was made by analysis of its n-m-r spectrum.

EXAMPLE XI

Tetrakis(trifluoromethyl)-1,3-dithietane

A solution of 10 g. (0.038 mole) of triphenyl phosphine in 15 ml. of acetone was added dropwise to 10.05 g. (0.025 mole) of bis(heptafluoro-2-propyl)disulfide cooled in ice. After one hour, the reaction mixture was distilled to dryness under vacuum, and the distillate was drowned in water. The organic layer was separated, dried over silica gel, and distilled. There was obtained 4.98 g. of tetrakis(trifluoromethyl)-1,3-dithietane as a colorless liquid, B.P. 110–111° C. The product was identified by its n-m-r spectrum and comparison with other samples.

The dithietane was similarly prepared by reaction of a mixture of bis(heptafluoro-2-propyl)disulfide, trisulfide, and tetrasulfide with triphenyl phosphine.

These sulfides were obtained as follows: A 400-ml. bomb containing 156 g. (0.29 mole) of bis(heptafluoro-2-propyl)mercury and 32 g. (1 mole) of sulfur was heated at 220° C. for 12 hours. The bomb was cooled and vented, the residue was filtered, and the filtrate distilled. There was obtained 30.5 g. of bis(heptafluoro-2-propyl)disulfide, B.P. 110–124° C., 39.5 g. of bis(heptafluoro-2-propyl)trisulfide, B.P. 150–155° C., and 12.7 g. of bis(heptafluoro - 2 - propyl)tetrasulfide, B.P. 180–186° C.

*Analysis.*—Calcd. for $C_6F_{14}S_2$: C, 17.9%; S, 15.9%. Found: C, 17.9%; S, 15.3%. Calcd. for $C_6F_{14}S_3$: C, 16.6%; S, 22.1%. Found: C, 17.0%; S, 22.0%. Calcd. for $C_6F_{14}S_4$: C, 15.4%; S, 27.4%. Found: C, 15.3%; S, 26.8%.

EXAMPLE XII (METHOD F)

Perfluoropropanethione

A 2.5 cm. "Vycor" resistant glass tube packed for a length of 25 cm. with quartz rings was connected to a trap cooled with liquid nitrogen and the system was evacuated with an oil pump. The packed tube was heated to 600° C. by means of an electric furnace, and 9.0 g. of tetrakis(trifluoromethyl-1,3-dithietane was added dropwise at such a rate that a pressure of 5–7 mm. was maintained in the tube. The condensate in the trap was warmed to −80° C. and the more volatile blue-black component was distilled at reduced pressure into another trap cooled in liquid nitrogen. There was obtained 2.4 ml. of hexafluorothioacetone as a blue-black liquid and 4.9 g. of the dithietane was recovered in the first trap.

Polyperfluoropropanethione (polyhexafluorothioacetone)

Pure perfluoropropanethione for the following examples was prepared by the pyrolysis of the preceding example.

EXAMPLE XIII

A glass trap containing 1 ml. of $BF_3$-etherate was immersed in liquid nitrogen and evacuated. Perfluoropropanethione, 5 ml., was distilled into the trap. The trap was removed from the liquid nitrogen bath, and the frozen contents were allowed to melt slowly. Acetone, 15 ml., was added to the trap when the blue color of the perfluoropropanethione had disappeared. The solid material in the trap was collected on a filter, washed with acetone, and dried. There was obtained 1.7 g. of polyperfluoropropanethione as a white, rubbery polymer, insoluble in most common solvents. The polymer was pressed at 50° C. and 10,000 lb./sq. in. into an elastomeric film.

*Analysis.*—Calcd. for $(C_3F_6S)_n$: S, 17.61%. Found: S, 17.28%.

EXAMPLE XIV

A solution of two drops of dimethylformamide in 5 ml. of ether contained in a glass trap was frozen in a liquid nitrogen bath. The trap was evacuated, and 2 ml. of perfluoropropanethione was distilled into the trap on top of the frozen ether. The entire frozen contents of the trap were warmed until about one-half melted. The contents were frozen again by immersing the trap in the liquid nitrogen bath and then remelted several times until the blue color of the thioketone was discharged. The trap was allowed to warm to room temperature, and 25 ml. of acetone was added. The polymer was collected on a filter, washed with acetone, and dried. There was obtained 0.7 g. of polyperfluoropropanethione as a white, rubbery solid.

*Analysis.*—Calcd. for $(C_3F_6S)_n$: C, 19.79%; F, 62.61%; S, 17.61%. Found: C, 20.27%; F, 62.94%; S, 17.95%.

EXAMPLE XV

A solution of one drop of dimethylformamide in 5 ml. of pentane contained in a glass trap was frozen solid in liquid nitrogen. The trap was evacuated, and 1 ml. of perfluoropropanethione was distilled into the trap. The trap and its contents were allowed to warm slowly to room temperature. As soon as the contents of the trap began to melt, they were mixed by vigorous shaking. After the trap had warmed to room temperature, 15 ml. of acetone was added and the white, rubbery polymer was collected. There was obtained 0.37 g. of polyperfluoropropanethione.

EXAMPLE XVI

The procedure described in Example XV was repeated, except that two drops of ethyl alcohol were used in place of the dimethylformamide. There was obtained 0.35 g. of white, rubbery polymer.

EXAMPLE XVII

The procedure described in Example XV was repeated, except that two drops of benzenethiol were used as the catalyst. There was obtained 0.19 g. of yellow, rubbery polymer.

EXAMPLE XVIII

The procedure described in Example XV was repeated, except that 1 ml. of dry ethyl ether was used as the catalyst. There was obtained 0.37 g. of white, rubbery polymer.

EXAMPLE XIX

The procedure described in Example XV was repeated, except that propane was used as solvent in place of the pentane. There was obtained 0.19 g. of rubbery polymer.

The new products of this invention include monomeric acyclic thioketones in which each of the carbons attached to the thiocarbonyl group is free from hydrogen. The carbons directly attached to the thiocarbonyl group together are attached to at least two and generally at least four fluorines. The remaining substituents are halogen, hydrocarbon, or halohydrocarbon. Preferred are compounds of the formula

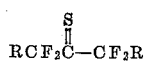

wherein R groups are halogen, hydrocarbon, or halohydrocarbon of up to six carbons. In addition to the compounds specifically disclosed in the preceding examples, by one or more of the methods previously described the following are likewise available:

Perfluorohexane-2-thione (from 2-iodoperfluorohexane by Method A),

Perfluoroheptane-2-thione (from 2-iodoperfluoroheptane by Method A),
Perfluorooctane-2-thione (by Method C starting with perfluoro-1-octene and mercuric fluoride),
Perfluorononane-2-thione (by Method C starting with perfluoro-1-nonene and mercuric fluoride), and
1,1,1,3,3-pentafluorobutane-2-thione (starting with 1,1,2,3,3-pentafluoro-1-propene and mercuric fluoride and employing Method C).

A further compound within the scope of this invention is trifluorothioacetophenone.

The monomeric polyfluorothioketones of this invention are useful in various applications. One application in which they are particularly useful is as insecticides. For example, 1-hydroperfluoro-3-butanethione is very effective in killing fruit flies. A glass container of one liter capacity containing 40 fruit flies (*Drosophila melanogaster*) is closed with a thin sheet of rubber. There is then injected into the container by means of a hypodermic syringe through the rubber cover 0.025 ml. of 1-hydroperfluoro-3-butanethione. The thioketone immediately evaporates to approximately 4 ml. of vapor, and the container is tumbled to cause mixing of the gases. In three minutes the flies begin to drop to the bottom of the container. In five minutes five flies are dead, in seven minutes only five flies are still flying, and in 10 minutes all the flies are dead. A one-liter container containing 15 fruit flies treated in the same way with the exception that no polyfluorothioketone is added results in the death of no fly after two hours. Other monomeric polyfluorothioketones of this invention also possess insecticidal activity.

The new monomers of this invention are reactive. They are relatively stable at temperatures of about $-80°$ C. for short periods of time. Above this temperature they react with themselves to form the dimeric dithietanes, of which tetrakis(trifluoromethyl)-1,3-dithietane is a new and useful member. The dithietanes which are perfluorinated, i.e., have no hydrogen on carbon, are stable compounds, generally liquid at about room temperature. Although they may be cracked by heating at high temperatures to the monomer, they are stable up to such a temperature, generally above about 400° C. They are useful as stable solvents and as heat transfer liquids and for electrical insulation, e.g., as transformer oils.

The monomers of this invention react with other compounds, e.g., they react with olefins to produce new sulfur-containing compounds.

Conversion of the monomer to dithietane dimer is accelerated by actinic light or a catalyst such as dimethylformamide or ether above $-80°$ C.

High molecular weight polymers of the monomers of the invention are obtained by use of very low temperature, i.e., below $-80°$ C., and temperatures of between about $-200$ and $-80°$ C. in the presence of any compound providing or accepting a pair of electrons (a Lewis acid or base).

Linear polymers of polyfluorothioketones are generally elastomeric and exhibit a high degree of chemical inertness. They can be extruded or otherwise shaped into various objects, including films and filaments. Self-supporting films obtained from the polymers are inert and useful as gasket material and containers for corrosive materials.

Since obvious modifications in the invention will occur to those skilled in the chemical arts, we propose to be bound solely by the appended claims.

The embodiments of the invention in which an exclusive property or privilege is claimed are defined as follows:

1. A polyfluorothioketone of the formula

wherein R and R' are selected from the group consisting of chlorine, lower alkyl, chloroloweralkyl and chlorofluoroloweralkyl.

2. Perfluoropropanethione.
3. Perfluorobutanethione.
4. Perfluoro-4-heptanethione.
5. 4H-heptafluoro-2-butanethione.
6. 4-choroheptafluorobutanethione.
7. The process which comprises reacting a phosphorus polysulfide with a compound of the formula

wherein R" and R''' are selected from the group consisting of chlorine, fluorine, lower alkyl, chloroloweralkyl, fluoroloweralkyl and chlorofluoroloweralkyl.

8. The process which comprises reacting a phosphorus polysulfide with 2-iodoperfluorobutane.

9. The process which comprises reacting a phosphorus polysulfide with 2-iodoperfluorohexane.

10. The process which comprises reacting a phosphorus polysulfide with 2-iodoperfluoroheptane.

No references cited.